United States Patent
Lamb et al.

(10) Patent No.: US 7,260,382 B1
(45) Date of Patent: Aug. 21, 2007

(54) METHOD AND SYSTEM FOR CUSTOMIZING A WIRELESS DEVICE'S USER-INTERFACE BASED ON WHICH VENDOR DISTRIBUTED THE WIRELESS DEVICE

(75) Inventors: Robert C. Lamb, Blue Springs, MO (US); Pierre Barbeau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 91 days.

(21) Appl. No.: 10/946,293

(22) Filed: Sep. 21, 2004

(51) Int. Cl.
*H04M 1/66* (2006.01)

(52) U.S. Cl. .................. 455/411; 455/419; 379/207.02

(58) Field of Classification Search .............. 455/411, 455/418, 419, 551, 451, 435.1; 379/88.01, 379/88.15, 207.02
See application file for complete search history.

(56) References Cited

U.S. PATENT DOCUMENTS

| | | | |
|---|---|---|---|
| 6,549,770 B1 * | 4/2003 | Marran | 455/419 |
| 6,963,635 B1 | 11/2005 | Jones | |
| 2003/0134614 A1 | 7/2003 | Dye | |
| 2003/0181223 A1 * | 9/2003 | Lee et al. | 455/563 |
| 2004/0148343 A1 | 7/2004 | Mottes | |
| 2004/0162058 A1 | 8/2004 | Mottes | |
| 2005/0079863 A1 * | 4/2005 | Macaluso | 455/419 |
| 2005/0080875 A1 | 4/2005 | Jethi | |
| 2006/0030315 A1 | 2/2006 | Smith | |
| 2006/0035631 A1 * | 2/2006 | White et al. | 455/418 |

FOREIGN PATENT DOCUMENTS

WO   WO 2005/020027 A2   3/2005

OTHER PUBLICATIONS

3rd Generation Partnership Project "Stage 1 Service Requirement for the 3GPP Generic User Profile (GUP)," Release 6, Sep. 2002, 27 pages.

* cited by examiner

*Primary Examiner*—Congvan Tran (57) ABSTRACT

A method and system for customizing a wireless device's user-interface is provided. During activation of the wireless device for service, the wireless carrier will use an identifier of the wireless device (such as an electronic serial number) as a basis to correlate the device with a vendor of the device and in turn to select a customization package that defines a user-interface corresponding with the vendor. For instance, the user interface can have color schemes, graphics, sounds and other attributes that are similar to the color schemes, graphics, sounds and other attributes that the vendor uses to promote the vendor's services or products. The wireless carrier will then send the customization package (or a pointer to the customization package) to the device, over the air in an activation response message for instance. And the device will responsively adopt the selected user interface as a base user interface.

25 Claims, 3 Drawing Sheets

METHOD AND SYSTEM FOR CUSTOMIZING A WIRELESS DEVICE'S USER-INTERFACE BASED ON WHICH VENDOR DISTRIBUTED THE WIRELESS DEVICE

FIELD OF THE INVENTION

The present invention relates to wireless communications and, more particularly, to customization of wireless devices.

BACKGROUND

Cellular wireless, like other forms of wireless communication, is an increasingly popular means of personal communication in the modern world. Consumers use cellular wireless networks for the exchange of voice and data over cellular telephones, PDAs, cellular telephone modems and other devices. In principle, a user can communicate over the Internet or call anyone over the Public Switched Telephone Network (PSTN) from any place inside the coverage area of the cellular wireless network.

In a typical cellular wireless system, an area is divided geographically into a number of cell sites, each defined by a radio frequency (RF) radiation pattern from a respective base transceiver station (BTS) tower. Each BTS in a cell is in turn coupled with a base station controller (BSC). And the BSC is then coupled to or functionally integrated with a switch (e.g., a mobile switching center (MSC)) and/or gateway (e.g., a packet data serving node (PDSN)) that provides connectivity with a transport network such as the PSTN or a public or private IP network (e.g., the Internet).

When a wireless device, such as a cellular phone or a Personal Digital Assistant ("PDA") is positioned in a cell, the wireless device may communicate via an RF air interface with the BTS of the cell. A communication can thus be established between the wireless device and another entity on the transport network, via the air interface, the BTS, the BSC and the switch or gateway.

Before a wireless device can engage in cellular or packet-data communication, the wireless device must be activated for both services within a service provider's network. Activation can be carried out at the point of sale, such as at a retail store where the user buys the wireless device and subscribes to service. In that scenario, a sales technician may collect subscriber billing information such as name, address and credit card number, and establish an account for the user of the device. The service provider may then assign a Mobile Identification Number (MIN), username and other activation data to the device and record that data in connection with the user's account, and the technician may program that data into the device for later use.

Alternatively, the activation process can be carried out over the air. An Over-The-Air Service Provisioning (OTASP) feature gives wireless service providers the ability to provision a wireless device remotely over the air interface instead of activating the devices at the point of sale. OTASP also allows providers to then modify an activated device's network parameters over the air, directly from the network.

To activate an OTASP-capable wireless device, a user makes a call to a service provider's customer service center, usually by dialing a service-provider-specific feature code and appropriate supplementary digits. The feature code results in the establishment of a voice call between the user and the service provider's customer service center. Subscriber billing information, such as a credit card number or mailing address, may be obtained before the customer service center starts the OTASP procedure.

Once the call to the customer service center is established, the wireless device's Electronic Serial Number (ESN) is supplied to the service provider's network. Then, an entity in the service provider's network will upload some Number Assignment Module (NAM) parameters from the wireless device. The NAM is a set of MIN and IMSI-related parameters that are stored in the wireless device's memory and used for mobile identification. The customer service center may also request that the wireless device upload other configuration parameters, such as mobile protocol and software versions, and any preferred roaming lists, if available. Then, if required, the service provider's network and the wireless device will exchange Authentication Key Generation parameters and generate an A-key. The A-key is used as a secure input during the mobile authentication process. After the A-key has been successfully generated, a Shared Secret Data (SSD) update procedure is performed. The purpose of the SSD update is to synchronize the SSD value stored in both the wireless device and an authentication center in the service provider's network. Like the A-key, the SSD value is used during the authentication process.

If the wireless device fails authentication, the wireless device may be denied service by the service provider, and the activation process will be terminated. If the wireless device is successfully authenticated by the customer service center, the service representative will perform the following: (i) assign a MIN to the wireless device; (ii) determine subscriber service needs; (iii) create a subscriber profile record in the service provider network's activation data base; and (iv) assign other NAM parameters needed by the wireless device.

Then, the service provider's network will transmit the required NAM parameters to the wireless device over the air interface. Thus, if the activation is successful, the wireless device or a signal received from the service provider's network may provide validity feedback to the user indicating that activation was completed successfully. If activation was completed successfully, cellular service can then begin for the wireless device.

In addition, a wireless device that is capable of engaging in packet-data communication (e.g., IP communication) may have a username and password that the device can use to gain packet network connectivity and to engage in packet-data communication. Typically, the username will be assigned by the wireless carrier and will be programmed into the wireless device. The username may take the form of a Network Access Identifier (NAI), and the password may be a predefined hash based on the device's unique ESN.

When such a wireless device seeks to gain packet network connectivity, typically after the device first acquires RF connectivity, the device may programmatically send into the carrier's network a message that carries the device's username and password, among other information. An authentication server or other entity in the carrier's network may then validate the username/password (e.g., ensuring that the password is correct, and ensuring that the username is not already in use on the network) and, upon successful validation, may assign an IP address for the device to use. The device may then commence packet data communication via the carrier's network.

SUMMARY

The present invention provides a method and system for customizing a wireless device. With the benefits of the invention as will be described below, a user can acquire a wireless device from a vendor and engage in activating the device for cellular service with a cellular service provider. During the activation session, the device's user-interface will be customized to display a user-interface associated with the vendor that sold or otherwise distributed the device to the user.

During the activation session, an entity in the service provider's network will receive from the wireless device the wireless device's ESN or other identifier, and based on the ESN or other identifier, match the device with a vendor that distributed the device to the user. The same or different entity in the service provider's network will then cause the device to display as its base user-interface a user-interface corresponding with the vendor that distributed the wireless device to the user. Optimally, this arrangement can allow vendors to have vendor-specific user-interfaces displayed on the devices they distribute.

In accordance with an exemplary embodiment of the invention, a vendor of wireless devices will sell or otherwise distribute wireless devices to users. The devices will come pre-configured with a wireless device identifier, which can be an ESN, and with other data that may be necessary to facilitate customization. The wireless device will also come pre-configured with data necessary for activation of the wireless device for cellular service. Before the wireless device's user-interface becomes customized or concurrently therewith, the wireless device will engage in an activation session with the cellular service provider. The activation session will preferably be an Over-The-Air Service Provisioning (OTASP) session.

The cellular service provider's network will be arranged to receive from a wireless device an activation request that contains a wireless device identifier. The network will further be arranged to match the wireless device identifier with a user-interface of the vendor that sold or otherwise distributed the wireless device and to then send an activation response to the device that causes the device to adopt and display that user-interface.

The cellular service provider's network may further be arranged to send a user-interface script that defines the user-interface, such as XML script, to the device. Alternatively, the network may be arranged to direct the device to retrieve a script that is pre-programmed into the device and to use the script to display the user-interface. Still alternatively, the wireless device may be directed to the URL of the user-interface customization package corresponding to the vendor. The wireless device may then download the customization package and adopt it as the base user-interface for the device.

Thus, in one respect, the exemplary embodiment may take the form of a method for customizing a wireless device to have a user-interface corresponding with a vendor. The method will comprise (i) receiving from a wireless device an activation request, wherein the activation request comprises at least a wireless device identifier, (ii) using the wireless device identifier as a basis to select a user-interface corresponding with a vendor of the wireless device, and (iii) sending to the wireless device an activation response that causes the wireless device to adopt the selected user-interface as a base user-interface for the device.

In another respect, the exemplary embodiment may take the form of a system that comprises (i) a customization server arranged to a customization request and to send a customization response to the wireless device during activation of a wireless device, and (ii) user-interface customization logic executable by the customization server to select, based on the wireless device identifier, a user-interface corresponding with a vendor of the wireless device.

In yet another respect, the exemplary embodiment may take the form of a method for customizing a user-interface of a wireless device. The method will comprise (i) receiving from a wireless device an activation request, wherein the activation request carries at least a wireless device identifier, and (ii) sending to the wireless device an activation response that provides the wireless device with customization data, wherein the customization data causes the wireless device to adopt as a base user-interface a user-interface corresponding with a vendor of the wireless device.

In still another respect, the exemplary embodiment may take the form of a method for activating a wireless device. The method will comprise (i) establishing an activation session between a wireless device and a service provider, (ii) automatically customizing during the activation session a user-interface for the wireless device based on a vendor that distributed the wireless device to a user, (iii) causing the wireless device to display as a base user-interface the user-interface corresponding with the vendor that distributed the wireless device to the user, and (iv) concluding the activation session between the wireless device and the service provider.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Network

A wireless device that is engaged in activation for cellular and/or packet-data communication service may concurrently undergo certain customization processes. According to an exemplary embodiment of the present invention, the wireless device can undergo a customization of its user-interface while it is being activated for cellular and/or packet-data communication services.

Figure 1:
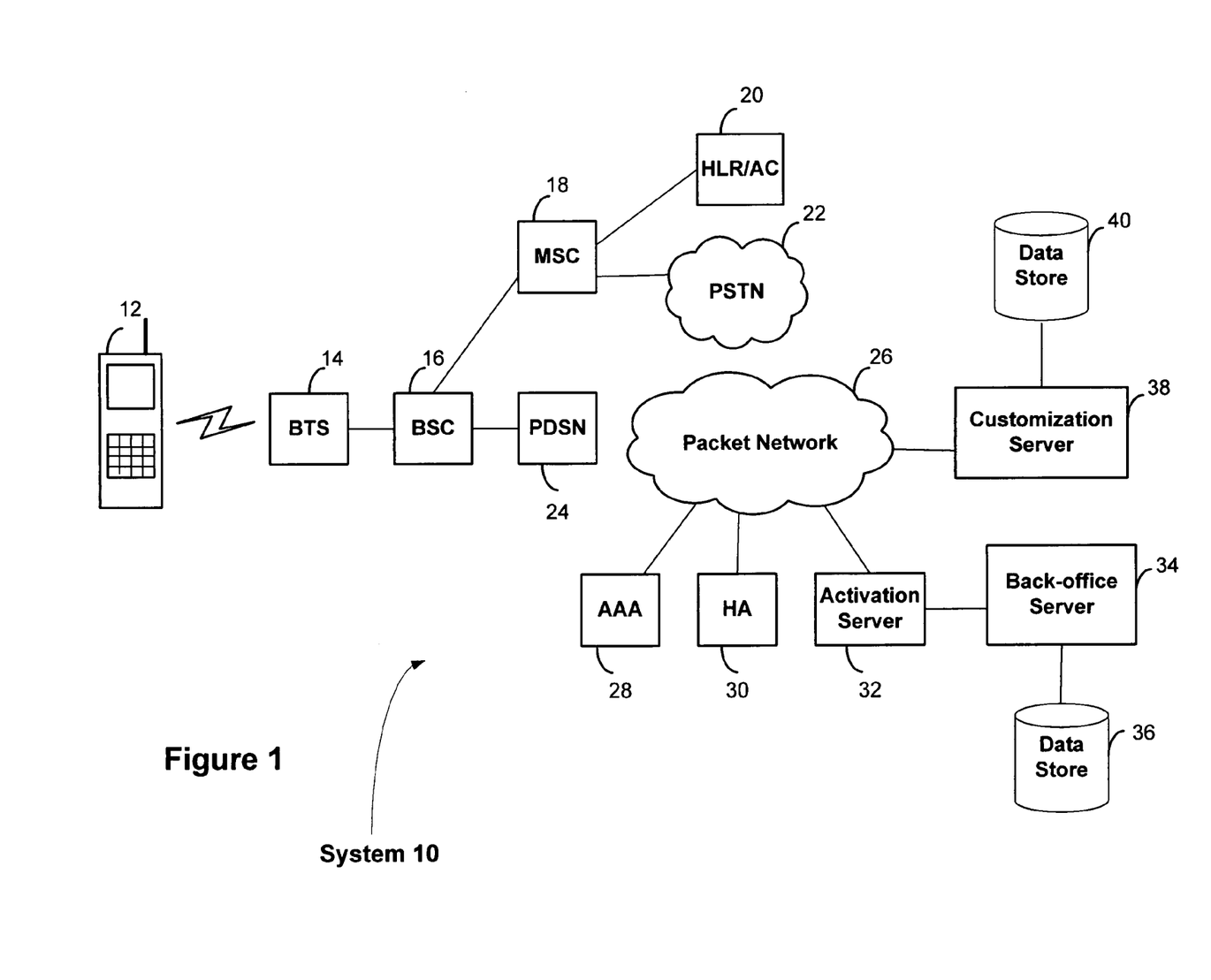
FIG. 1 is a simplified block diagram of a wireless communication system in which the exemplary embodiment can be carried out.

Referring to the drawings, FIG. 1 is a simplified block diagram of a typical wireless communication system 10 in which an exemplary embodiment of the invention can be carried out. It should be understood, however, that this and other arrangements shown and described herein are exemplary only, and that many variations are possible. For instance, various elements could be combined, distributed, added or omitted. Further, it should be understood that entities described as carrying out various functions can be arranged to carry out those functions through software, firmware and/or hardware logic.

As generally illustrated in FIG. 1, the wireless communication system 10 includes a BTS 14 that radiates to provide an RF coverage area within which a wireless device can operate. The wireless device can be a fixed or mobile device and can take various forms, examples of which include a cell phone 12 or a wirelessly-equipped PDA, among others. Although only one such device is depicted in FIG. 1, system 10 could in theory support any number of wireless devices.

As further illustrated, BTS 14 is coupled with a BSC 16, which controls signaling over the RF air interface between the BTS and the wireless device. In turn, BSC 16 is coupled with or integrated into an MSC 18, which provides connectivity with a circuit-switched network such as the PSTN 22. Additionally, BSC 16 is coupled with a PDSN or other gateway 24, which provides connectivity with a packet-data network 26, such as a wireless carrier's core packet network and/or the Internet. (Typically, the PDSN would connect with a carrier's core network, and the core network would connect via a firewall with the Internet.)

Conventionally, MSC 18 is coupled via a carrier's signaling network (not shown) with a home location register (HLR)/authentication center (AC) 20, as defined by well known industry standard ANSI-41. (The HLR/AC is just one example of a network authentication entity; other examples include the HLR itself and the AC itself.) In this regard, the MSC 18 and HLR/AC 20 would normally communicate with each other according to the messaging and procedures defined by ANSI-41 and other well known industry standards such as ANSI-771 for instance. However, the manner of communication could take other forms as well.

HLR/AC 20 and MSC 18 work together to authenticate and admit wireless devices seeking to gain RF connectivity so as to be able to communicate via the carrier's system. For this purpose, HLR/AC 20 contains subscriber account information that indicates a MIN, ESN and A-key, for each wireless device that subscribes to service in the serving area covered by HLR/AC 20. The HLR/AC 20 and MSC 18 may be programmed to engage in a standard authentication process based on this activation data when a wireless device seeks to gain RF connectivity.

Further, the HLR/AC 20 (particularly, the HLR portion) would conventionally maintain or have access to a list of all MIN/ESN pairs that subscribe to service as well as an indication of which of those MIN/ESN pairs are currently in use at any given time. The HLR/AC 20 may then be programmed to check the MIN/ESN pair of any wireless device seeking to gain RF access, so as to ensure that the MIN/ESN pair is a valid pair and is not already in use by another device.

Thus, by way of example, when a wireless device seeks to register in the serving system of the MSC 18, the device would conventionally send an ANSI-41 Registration Request (REGREQ) message via an air interface access channel, and via the BTS 14 and BSC 16, to MSC 18. The Registration Request message would typically carry (i) the device's MIN and ESN, (ii) an authentication result (AUTHR) that the device computed using a predefined algorithm as a function of its MIN, ESN, A-key and perhaps other data, and (iii) one or more other parameters, such as a random number (RANDC) previously broadcast by the serving MSC 18.

Upon receipt of the Registration Request, the MSC 18 may pre-validate the wireless device by checking to ensure that the random number (RANDC) provided by the device is correct. In turn, the MSC 18 may send an ANSI-41 Authentication Request (AUTHREQ) message to the HLR/AC 20, providing the HLR/AC with the MIN and ESN. The HLR/AC would then validate the MIN/ESN pair, to ensure that it is a valid pair and that it is not already in use. Further, the HLR/AC would compute its own AUTHR, applying the same predefined algorithm as a function of the MIN, ESN and the A-key that the HLR/AC has on record for the device and would send the AUTHR in an authreq return result message to the MSC. The MSC would then compare the HLR/AC-computed AUTHR with the device-computed AUTHR. If they match, then the MSC may grant the device RF access; otherwise, the MSC may deny the access request.

In addition, sitting on packet network 26 may conventionally be an authentication, authorization, and accounting (AAA) server 28 and a mobile-IP home agent (HA) 30. The AAA server 28 functions to authenticate a device that is seeking to gain packet-data connectivity (e.g., to acquire an IP address), and to keep accounting records reflecting the extent of data communication per device, for billing purposes. As such, the AAA server would typically maintain or have access to a list of usernames and passwords for subscriber accounts, so that the AAA server can validate a username/password pair provided by a device when the device seeks to gain packet-data connectivity. The home agent 30, in turn, conventionally functions to assign mobile-IP addresses and to manage mobility of devices across networks or sub-networks.

In typical practice, when a wireless device seeks to gain packet-data connectivity (e.g., upon user request or autonomously), the device would send an ANSI-41 Origination Request (ORREQ) message via an air interface access channel, and via BTS 14 and BSC 16, to MSC 18. The Origination Request message would carry a "packet data" service option code, which signals to the MSC that the device is seeking to gain packet-data connectivity rather than trying to place a conventional voice call. In response to the packet-data service option code, the MSC would then signal to the BSC 16, and a packet-control-function (PCF) in the BSC would then signal to the PDSN 24 for further processing.

The PDSN 24 and the device would then engage in a standard negotiation to establish a data link layer connection, typically a point-to-point protocol (PPP) session over which packet-data can be exchanged between the wireless device and the PDSN. With that data link layer connection established, the wireless device would then conventionally send a mobile-IP Registration Request message to the PDSN, seeking to acquire a mobile-IP address to facilitate packet-data communication. The mobile-IP Registration Request message would carry the device's username and password, among other information.

Conventionally, the PDSN would then send the Registration Request to the AAA server 28, which may validate the username/password combination, among other actions. The PDSN would then send the Registration Request message to the mobile-IP home agent 30, which would assign and send a mobile-IP address in a registration reply message to the PDSN. In turn, the PDSN would send the registration reply message to the wireless device, providing the mobile-IP address. And the wireless device may then commence IP communication using that mobile-IP address.

The exemplary system 10 may also include an activation server 32 sitting on the core packet network 26. The activation server may be an IP Based Over-the Air (IOTA) Handset Configuration Management activation server, which provisions packet-data wireless communication devices for data service and performs over-the-air mobile device configuration and management operations.

With IOTA, once the wireless device 12 first registers with the radio access network, the service provider sends to the device a WAP PUSH message (typically an SMS message with a special code in it that causes the device to recognize the message as a WAP PUSH message). The WAP PUSH message causes the device to establish packet-data connectivity and to send an HTTP GET request to a URL of the IOTA activation server. When sending the HTTP GET request to the URL of the IOTA activation server, the device will use a username in the form of an NAI (as defined by the well known RFC 2486).

The NAI has a username portion and a realm portion. In the exemplary embodiment, the username may be unique per device, such as the device's serial number, ESN, MIN, or another identifier that allows the IOTA activation server to determine which device is communicating. The realm portion may be a shared identifier such as "pre-activation," which designates that the wireless device is not yet activated for packet-data communication service, or "activateddevices," which designates that the wireless device is already activated for the same. Thus, when sending the HTTP GET request to the URL of the IOTA activation server, the device uses as the username its "username@pre-activation" NAI, since it does not yet have a post-activation NAI.

Further, an authentication header of the GET request carries the device's ESN. The IOTA server is programmed to look for the "username@pre-activation" NAI and for the ESN. The IOTA activation server 32 may then query a back-office server 34 to get whatever information the IOTA activation server 32 needs to provide to the wireless device 12. For example, the IOTA activation server 32 may query the back-office server 34 to obtain a post-activation NAI (e.g., "username@activateddevices") corresponding to the wireless device's ESN. In this regard, the back-office server may look up the ESN in a data store 36 or apply some other sort of process to determine what "username@activateddevices" NAI to assign to the wireless device 12.

2. Customization During Activation

As presently contemplated, the IOTA activation server may also be arranged to query the back-office server 34 by reference to the wireless device's ESN (or other provided identifier) to determine which vendor sold or otherwise distributed the wireless device to the user. Based on that query result, the back-office server 34 will then select from the data store 36 a user-interface customization package and send it back to the IOTA activation server. The IOTA activation server will then send the selected user-interface customization package to the wireless device 12. Alternatively, the back-office server 34 itself may look up the vendor based on the device identifier and/or may send the selected customization package directly to the wireless device 12.

Still alternatively, the back-up server 34 or the IOTA activation server may send to the wireless device an instruction containing the URL of the selected user-interface customization package. The URL may point to an entity in the service provider's network or another entity outside the service provider's network. Wherever the selected customization package is stored, the device will go to that URL to download the customization package and adopt the package as the base user-interface.

In accordance with the exemplary embodiment, system 10 may also include a customization server 38. As presently contemplated, the IOTA activation server 32 may query the customization server 38 by reference to the wireless device's ESN (or other provided device identifier) to determine which vendor sold the wireless device to the user. Based on that query result, the customization server 38 will then select from a data store 40 a user-interface customization package and send it back to the IOTA activation server. The IOTA activation server will then send the selected customization package to the wireless device 12. Alternatively, the customization server 38 itself may send the selected customization package directly to the wireless device 12. Still alternatively, the customization server 38 may send to the wireless device an instruction containing the URL of the selected user-interface customization package. The device would then go to that URL to download the customization package and then adopt the package as the base user-interface.

In a preferred embodiment, the customization package could be a binary file that includes user-interface customization data in a manner that the device is able to understand and in response to which the device can thereby customize its user-interface. The binary package may, for instance, include images, colors, styles, sounds, fonts, etc., corresponding with the vendor that sold or otherwise distributed the wireless device to the user.

3. Customizing for Voice-Only Wireless Devices

For wireless devices that do not have packet-data capabilities, the user-interface customization is confined to the RF network. HLR/AC 20 or another entity may provision voice-only wireless devices with user-interface customization packages that correspond to a device's ESN. When a wireless device seeks RF connectivity for the first time and submits its activation data (at least its MIN/ESN set) to the HLR/AC 20, the HLR/AC 20 may use at least the device's ESN to select a user-interface corresponding with a vendor of the device. The HLR/AC 20 may have access to a data store which contains ESN listings and their corresponding customization packages, or which correlates ESNs with vendors and vendors with customization packages. The HLR/AC 20 could query the data store to determine which user-interface corresponds to a given ESN and then send a user-interface customization package to the wireless device 12 in a sequence of specially coded SMS messages.

The SMS messages could include a header that the wireless device 12 would interpret to mean that the SMS message is carrying a user-interface customization package. Depending on the type and size of the customization package, the HLR/AC 20 may send the customization package in a single SMS message or in a sequence of SMS messages. The SMS messages may also or alternatively contain an instruction that causes a wireless device to retrieve from the device's data storage a pre-programmed user-interface customization package.

4. Exemplary Wireless Device

Figure 2:
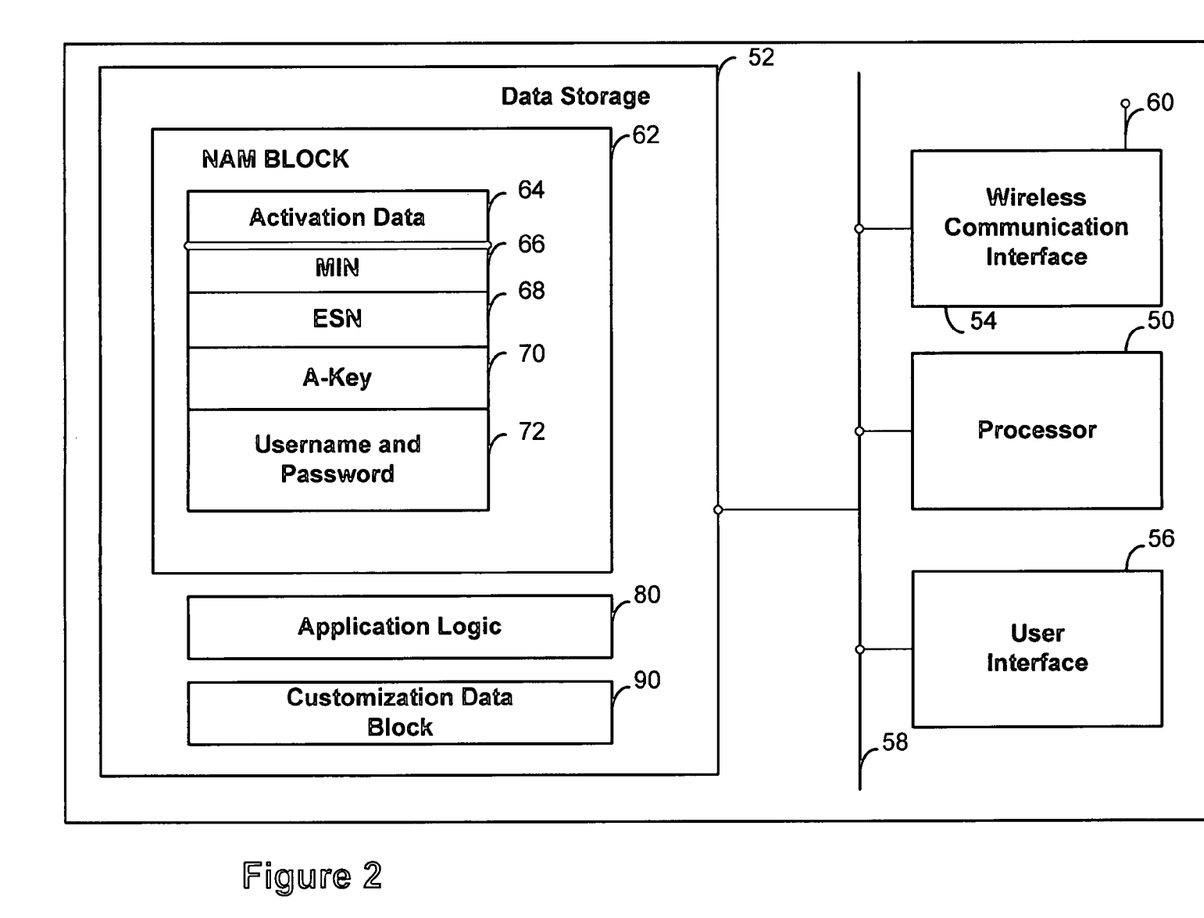
FIG. 2 is a functional block diagram if an exemplary wireless device in accordance with the exemplary embodiment.

FIG. 2 is a functional block diagram of an exemplary wireless device 12. The wireless device 12 includes a processor 50, data storage 52, a wireless communication interface 54, and a user interface 56, all of which may be tied together by a system bus or other mechanism 58.

The processor 50 may comprise one or more general purpose microprocessors and/or dedicated signal processors.

(The term "processor" encompasses either a single processor or multiple processors that could work separately or in combination.) The data storage 52, in turn, may comprise volatile memory, non-volatile memory (e.g., Flash ROM or storage drive), and/or other sorts of storage space and could be integrated in whole or in part with processor 50. Wireless communication interface 54 may include an antenna 60 and a standard chipset for engaging in wireless communication according to an accepted protocol such as CDMA, TDMA, or GSM, for instance, or according to another specified protocol. By way of example, the chipset could be an MSM6700™ chipset available from Qualcomm Incorporated of San Diego, Calif., which supports voice and data communication according to the well known CDMA2000 protocol. User interface 56 may then include input and output mechanisms, such as a microphone, keypad, display and speaker, for instance, to facilitate interaction with a user.

According to the exemplary embodiment, data storage 52 holds a NAM block containing activation data, application logic, and a customization data block, for instance. Activation data is used by the wireless device to gain access to the service provider's network and for activation of the wireless device for cellular and/or packet-data service. Activation data may be in the form of a MIN 66, an A-key 70, an ESN 68, and username and password 72, as described above.

As mentioned above, the activation data will be used to gain RF connectivity and packet-data connectivity, so that the IOTA activation server 32 could activate the device. Optimally, any of the activation parameters alone or in combination will allow a wireless device to gain access to the service provider's network.

In addition, data storage 52 on device 12 will preferably include a set of application logic 80 that is executable by the processor 50 on the device to carry out various functions described herein. For example, the application logic 80 may be arranged (i) to detect, upon power-on, that the device is not yet activated, and (ii) to responsively use the device's activation data 64 to gain RF connectivity and packet-data connectivity and to communicate with the IOTA activation server 32.

The application logic 80 will also be able to detect and respond to messages sent from the network. For example, the application logic 80 will recognize an incoming WAP PUSH message sent by the service provider in response to the wireless device registering on the radio access network, and cause the wireless device to establish packet-data connectivity and send an HTTP GET request to the URL of the IOTA activation server 32.

The application logic 80 also causes a wireless device to accept and adopt a customization package sent by the IOTA activation server 32, the customization server 38, or another entity. For instance, the application logic can receive and process instructions from the IOTA activation server or the customization server to go to a URL that the IOTA activation server designated as the URL of the selected user-interface customization package, and to then download and adapt that customization package as the device's base user-interface. Alternatively, if the IOTA activation server 32 or the customization server 38 sends a binary file containing the user-interface customization package, the application logic 80 will recognize the binary file as the user-interface that the device will adopt, and cause the device to customize its user-interface accordingly.

Data storage 52 may also contain a customization data block 90 containing pre-programmed user-interface customization packages or elements thereof. For example, customization data block 90 could contain a "Vendor ABC" user-interface customization package that the device may eventually be directed to retrieve and adopt as the device's base user-interface. Customization block 90 may also contain various elements corresponding to various user-interface customization packages. For instance, the elements may be sounds, border colors, font colors, etc. of a user-interface package the customization server 38 or another entity sends over to the wireless device to adopt.

Thus, according to the exemplary embodiment, if the IOTA activation server or the customization server sends an instruction telling the application logic to retrieve a certain pre-programmed user-interface customization package from customization data block 90, the application logic 80 will query the customization data block 90 for the user-interface customization package identified in the instruction, and cause the device to adopt the package.

5. Exemplary Operation

Figure 3:
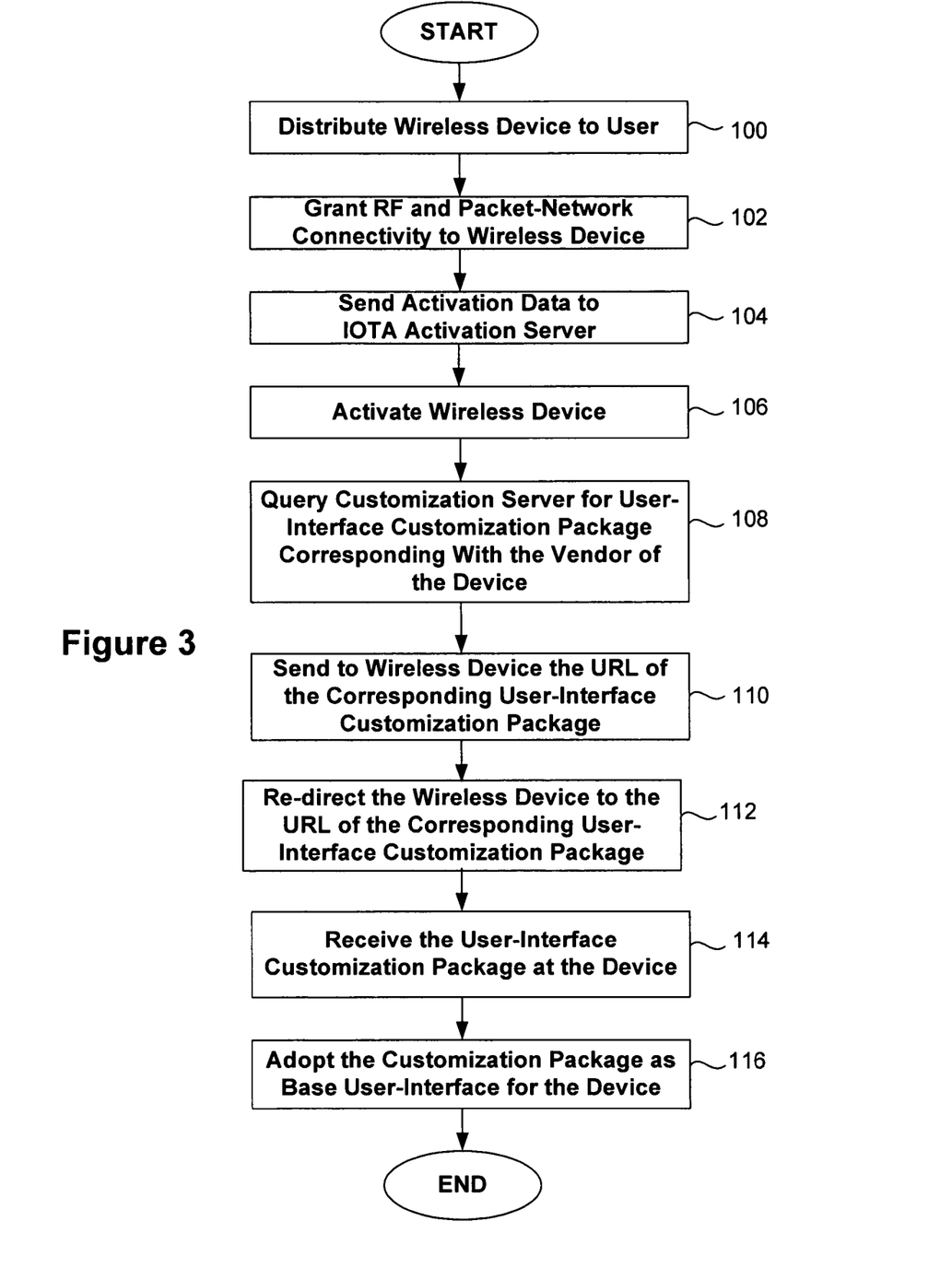
FIG. 3 is a flow chart, depicting functions that can be carried out in accordance with the exemplary embodiment.

Referring to FIG. 3, a flow chart is provided to help illustrate some of the functions that can be carried out in accordance with the exemplary embodiment. As shown in FIG. 3, at block 100, a vendor distributes a wireless device 12 to a user. At block 102, the service provider grants RF and packet network connectivity to the device. Thereafter, at block 104, the wireless device engages in activation with the IOTA activation server by sending to the activation server its activation data. At block 106 the IOTA activation server uses the activation data to activate the wireless device and to customize the wireless device's user-interface. The activation and customization of the wireless device can be carried out concurrently or sequentially by the IOTA activation server.

Thus, to customize the device's user-interface, the IOTA activation server establishes communication with a customization server 38 and queries the customization server to determine by reference to the device's ESN (or possibly other provided device identifier) which vendor sold the device, and to select a user-interface customization package corresponding to the vendor at block 108. In a preferred embodiment, the customization package could be a binary file that includes user-interface customization data in a manner that the device is able to understand and in response to which the device can thereby customize its user-interface. The binary package may, for instance, include images, colors, styles, fonts, sounds, etc., corresponding with the vendor that distributed the wireless device.

In one embodiment, before the IOTA activation server 32 queries the customization server 38, the activation server can look up in the profile store 36, based on the ESN or another provided device identifier, what type of device the device is, e.g., what make or model. The IOTA activation server can provide the device type information to the customization server 38, together with the ESN. And, the customization server 38 can use that device type information to select a suitable customization package that would work on that type of device.

Alternatively, the customization server 38 itself can query the profile store 36 to learn the device type, and the customization server can use that device type information to select a suitable customization package that would work on the type of the device. Still alternatively, it is possible that device type would not be considered at all, but rather that some common customization package would exist for each vendor. Further, it is possible that a given customization package could exist for multiple vendors, or that every vendor would have a respectively unique customization package. In any event, the customization server would preferably include or have access to predefined customization packages, and correlation data that indicates which customization package corresponds with which vendor, and perhaps further with which device type (on top of the vendor basis).

At block 110, the customization server would reply to the IOTA activation server with a URL of the selected customization package. At block 112, the IOTA activation server would redirect the device to that URL. At block 114 the wireless device will go to that URL and get the customization package. At block 116 the device will adopt the customization package as its base user-interface. Alternatively, the customization server 38 could send the entire customization package in a reply to the IOTA activation server, and the IOTA activation server could in turn send it to the device.

Still alternatively, the wireless device could have a plurality of user-interface customizations pre-programmed into the device's customization data block, and the customization package could simply point to a particular one of those user-interface customizations for the device to adopt. Or the device could have pre-programmed in its customization data block a plurality of customization elements, and the customization package could direct the device to adopt particular ones of the customization elements. For instance, the device could be programmed with the elements "outside border color," "inside border color," "font," "ringtone," etc., and the customization package can tell the device what values to use for the various elements, so as to establish a customized user-interface corresponding to the vendor.

Thus, according to the exemplary embodiment and by way of example, "XYZ" vendor may sell or otherwise distribute to a user a device with the wireless device identifier "ABC123456." To start using the device, the user will activate the device, preferably via Over-The-Air Service Provisioning. To engage in an Over-The-Air Service activation, the user will initiate a call to a service provider and dial an activation code. During that call the user will supply the provider with billing information, e.g., credit card information, and the provider will set up service options for the user.

Furthermore, as part of the activation session the wireless device will upload to an activation server its wireless device identifier "ABC123456." The activation server will query a data base that has records of device identifiers, vendors, and user-interfaces so as to correlate the "ABC123456" device with vendor "XYZ's" user-interface. That result will determine which user-interface the "ABC123456" device will display. Thus, the query may determine that the "ABC123456" device was purchased from the "XYZ" vendor, and that "XYZ's" user interface is, for example, a purple rim around the screen and the "XYZ" logo.

Thereafter, the provider will send to the "ABC123456" device an activation signal that will, among other things, request the device to display the purple rim around the screen and the "XYZ" logo as the device's base user-interface. As part of the signal requesting the device to display that user-interface, the activation server will send to the device the URL of the appropriate user-interface, or script, such as XML script, that will enable the device to display the user-interface. Alternatively, the wireless device may be pre-programmed with the XML script, and may just need to retrieve the script for the purple rim around the screen and the "XYZ" logo user-interface and use it to display the user-interface. If the latter is true, then in addition to the signal telling the device to display the purple rim around the screen and the "XYZ" logo user-interface, the provider may send a command directing the device to retrieve the user-interface script and use it to display the user-interface.

6. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A method for customizing a wireless device to have a user-interface corresponding with a vendor, the method comprising:
   receiving from a wireless device an activation request, wherein the activation request comprises at least a wireless device identifier;
   using the wireless device identifier as a basis to select a user-interface corresponding with a vendor of the wireless device; and
   sending to the wireless device an activation response that causes the wireless device to adopt the selected user-interface as a base user-interface for the device.

2. The method of claim 1, wherein the wireless device identifier comprises an Electronic Serial Number (ESN).

3. The method of claim 1, wherein sending to the wireless device the activation response comprises sending to the wireless device data indicative of the selected user-interface.

4. The method of claim 3, wherein sending to the wireless device data indicative of the selected user-interface comprises sending to the wireless device a script executable by the wireless device to adopt and display the selected user-interface.

5. The method of claim 4, wherein the script comprises XML script that defines the selected user-interface.

6. The method of claim 3, wherein sending to the wireless device data indicative of the selected user-interface further comprises sending to the wireless device an instruction directing the wireless device to retrieve from data storage a script for the selected user interface and use the script to generate and display the selected user-interface.

7. The method of claim 1, wherein receiving from the wireless device the activation request comprises receiving the activation request over a wireless air interface.

8. The method of claim 1, wherein sending to the wireless device the activation response comprises transmitting the activation response over the wireless air interface.

9. A system comprising:
   a customization server arranged to receive a customization request and to send a customization response during activation of a wireless device, wherein the customization request carries a wireless device identifier and the customization response carries user-interface data that causes the wireless device to adopt a user-interface selected by the customization server as a base user-interface for the device; and
   user-interface customization logic executable by the customization server to select, based on the wireless device identifier, a user-interface corresponding with a vendor of the wireless device.

10. The system of claim 9, wherein the wireless device identifier comprises an Electronic Serial Number (ESN).

11. The system of claim 9, wherein the user-interface data comprises data indicative of the selected user-interface.

12. The system of claim 11, wherein the data indicative of the selected user-interface comprises a script executable by the wireless device to adopt and display the selected user-interface.

13. The system of claim 12, wherein the script comprises an XML script that defines the selected user-interface.

14. The system of claim 11, wherein the data indicative of the selected user-interface further comprises an instruction directing the wireless device to retrieve a script from data storage and use the script to generate and display the selected user-interface.

15. The system of claim 9, wherein the customization request from the wireless device is received over a wireless air interface.

16. The system of claim 9, wherein the customization response is transmitted to the wireless device over the wireless air interface.

17. A method for customizing a user-interface of a wireless device, the method comprising:
   receiving from a wireless device an activation request, wherein the activation request carries at least a wireless device identifier; and
   sending to the wireless device an activation response that provides the wireless device with customization data, wherein the customization data causes the wireless device to adopt as a base user-interface a user-interface corresponding with a vendor of the wireless device.

18. The method of claim 17, wherein the wireless device identifier comprises an Electronic Serial Number (ESN).

19. The method of claim 17, wherein providing the wireless device with customization data comprises sending to the wireless device data indicative of a corresponding user-interface.

20. The method of claim 19, wherein sending to the wireless device data indicative of the corresponding user-interface comprises sending a script executable by the wireless device to adopt and display the corresponding user-interface.

21. The method of claim 20, wherein the script comprises an XML script that defines the corresponding user-interface.

22. The method of claim 19, wherein sending to the wireless device data indicative of the corresponding user-interface further comprises sending an instruction directing the wireless device to retrieve a script from data storage and use the script to generate and display the corresponding user-interface.

23. The method of claim 17, wherein receiving from the wireless device the activation request comprises receiving the activation request over a wireless air interface.

24. The method of claim 17, wherein sending to the wireless device the activation response comprises transmitting the activation response over the wireless air interface.

25. A method for activating a wireless device, the method comprising:
   establishing an activation session between a wireless device and a service provider;
   automatically customizing during the activation session a user-interface for the wireless device based on a vendor that distributed the wireless device to a user;
   causing the wireless device to display as a base user-interface the user-interface corresponding with the vendor that distributed the wireless device to the user; and
   concluding the activation session between the wireless device and the service provider.

* * * * *